United States Patent
Deschamps et al.

(10) Patent No.: US 7,072,499 B2
(45) Date of Patent: Jul. 4, 2006

(54) MEDICAL IMAGING STATION WITH RAPID IMAGE SEGMENTATION

(75) Inventors: Thomas Deschamps, Boulogne Billancourt (FR); Laurent Cohen, Neuilly-sur-Seine (FR)

(73) Assignee: Koninklijke Philips Electrnoics, N.V., Eindhoven (NL)

( * ) Notice: Subject to any disclaimer, the term of this patent is extended or adjusted under 35 U.S.C. 154(b) by 784 days.

(21) Appl. No.: 10/277,589

(22) Filed: Oct. 22, 2002

(65) Prior Publication Data
US 2003/0118221 A1 Jun. 26, 2003

(30) Foreign Application Priority Data
Oct. 23, 2001 (FR) .................... 01 13672

(51) Int. Cl.
*G06K 9/00* (2006.01)
(52) U.S. Cl. .................. 382/128; 382/199; 128/922
(58) Field of Classification Search ............ 382/128, 382/199; 128/922
See application file for complete search history.

(56) References Cited

U.S. PATENT DOCUMENTS

| | | | | |
|---|---|---|---|---|
| 4,910,786 | A * | 3/1990 | Eichel .................. | 382/199 |
| 6,201,543 | B1 * | 3/2001 | O'Donnell et al. ......... | 345/420 |
| 6,842,638 | B1 * | 1/2005 | Suri et al. ................ | 600/425 |
| 2002/0164074 | A1 * | 11/2002 | Matsugu et al. .......... | 382/173 |

FOREIGN PATENT DOCUMENTS

EP 1058913 3/1999

OTHER PUBLICATIONS

Sethian et al: "Level sets methods and fast marching methods, evolving interfaces in computational geometry, fluid mechanics, computer science and material science" Cambridge University Press, 1999, pp. 86-100.
Deschanmps et al: "Minimal Paths in 3D Images and Application to virtual Endoscopy" Proc. 6th European on Computer Vision, ECCV 2000, Dublin, Jun./Jul. 2000 In: Lecture Notes in Computer Science, vol. 1843, 2000, pp. 543-557.

* cited by examiner

*Primary Examiner*—Samir Ahmed
*Assistant Examiner*—Anand Bhatnagar

(57) ABSTRACT

The invention concerns a medical imaging station including segmentation means for segmenting at least one imaged object in an image having gray levels, by propagating an edge from at least one initial point positioned in the image on the imaged object. The speed of propagation of the edge depends on said gray levels at each point referred to as a current point and the segmentation means segmenting the image between the points over which the edge passes and the points over which the edge does not pass. According to the invention, the edge propagation means are coupled with means of automatically detecting an emergence of the propagation edge from the imaged object at a current point. Means of locally fixing the speed of propagation at zero at this current point are activated in the event of detection of an emergence of the propagation edge.

8 Claims, 2 Drawing Sheets

MEDICAL IMAGING STATION WITH RAPID IMAGE SEGMENTATION

Figure 1:
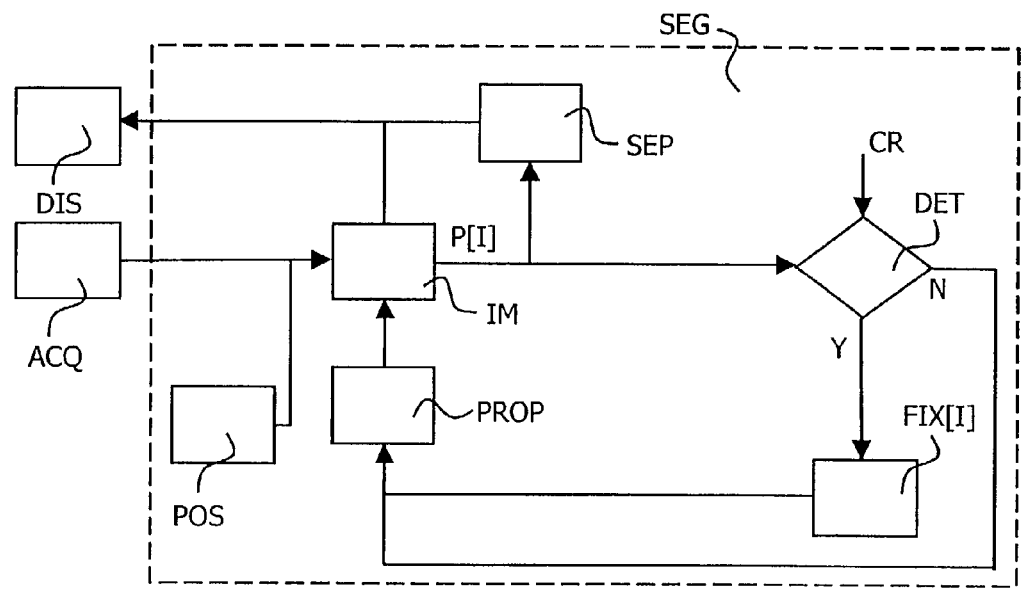

The invention concerns a medical imaging station including acquisition means for obtaining images having gray levels, display means for displaying the images, segmentation means for segmenting at least one imaged object in an image, using means of propagating an edge on the points of the image from at least one initial point positioned in the image on the imaged object by point positioning means, a propagation whose speed depends on said gray levels at each point referred to as the current point, the segmentation being effected between the points through which the edge passes and the points through which the edge does not pass.

Many methods of acquiring medical images can provide images having gray levels. Thus the invention can be used for images obtained by ultrasonic, radiological or magnetic resonance techniques. It may be noted that the gray levels can possibly be replaced in an equivalent manner with levels of a particular color different from gray.

Segmentation means according to the introductory paragraph in general use algorithms of the shortest-path type: Dijkstra or A* algorithm. The shortest-path algorithms type seek the least expensive path from among the possible paths for propagating an edge. The propagation of the edge is effected according to propagation equations which may advantageously be made discrete in order to effect a calculation of the costs gradually. A "Fast Marching" algorithm is then spoken of in English. The propagation is continuous and takes place in all directions. The cost of the paths is given by means of a given equation, for example the Eikonal equation, with a speed dependent on the gray levels in the image. For example, for a light vessel on a dark background, the edge will propagate more rapidly inside the vessel. This makes it possible to obtain rapid segmentation with a generally average precision of image objects by separating the points through which the edge has passed from those which have not been passed through. The book "Level sets methods and fast marching methods, evolving interfaces in computational geometry, fluid mechanics, computer science and material science" by J. A. Sethian, published by Cambridge University Press, 1999, explains more exactly the functioning of such algorithms. Since propagation may take place in two or three dimensions in the state of the art, it is noteworthy to emphasize that the invention can also be implemented for flat images in two dimensions or spatial images in three dimensions respectively. Such segmentation means are for example known from European patent EP1058913.

The segmentation means according to the state of the art function correctly when the gray levels between the inside of an imaged object and the outside are very different, that is to say there exists a strong contrast between the two zones. When on the other hand the contrast is less great, the edge does not stop at the boundaries of the object and continues to propagate outside the object. The segmentation obtained is then false, with the drawbacks which this may present, in particular in the medical field. This drawback exists in particular for slender objects with which, the propagation taking place in all directions and not having any stop criterion dedicated to preventing it, the edge propagates outside the object in the directions where the object has the smallest dimensions.

One object of the invention is to provide a medical imaging station including segmentation means which make it possible to avoid "leakages" of the propagation of the edge, in particular when the contrast is low and/or the object to be imaged is slender. Avoiding "leakages" is essential for the use of the imaging station for vessels in two or three dimensions. A medical imaging station in accordance with the introductory paragraph is characterized according to the invention in that the edge propagation means are coupled with means for automatic detection of an emergence of the propagation edge from the imaged object at a current point, means for local fixing of the speed of propagation at zero at this current point being activated in the event of detection of an emergence of the propagation edge.

The invention thus proposes a step of local fixing of the propagation speed at zero at a current point. This step makes it possible in particular to stop the propagation locally while the propagation continues at other parts of the image. In the particular case of vessels, it is advantageous to "freeze the points" by allocating a zero value to the speed of propagation at points which are situated outside the vessel and therefore making the speed at these points independent of the image. This is because, in this case, the propagation of the edge continues along the vessel but is stopped for points where emergence from the object by the edge is detected. The detection of emergence of the object by the edge is achieved according to several embodiments presented below.

The invention also concerns a segmentation device intended to be used within a medical imaging station and a segmentation method. The use of a medical imaging station according to the invention makes it possible to obtain very rapid and precise image segmentation including in the case of low contrast and/or in the case of the segmentation of a slender object. The display means can consequently display the segmentation in two or three dimensions and possibly its change during the propagation of the edge.

The invention will be further described with reference to examples of embodiment shown in the drawings to which, however, the invention is not restricted.

Figure 4:
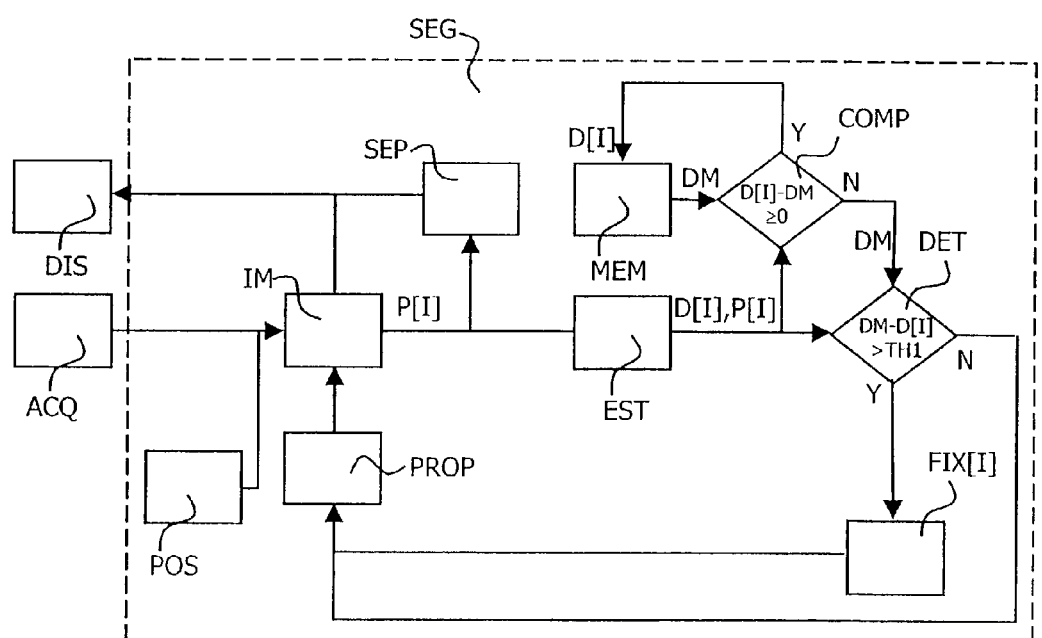
Figure 2:
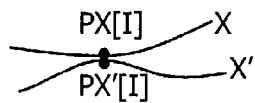
Figure 3:
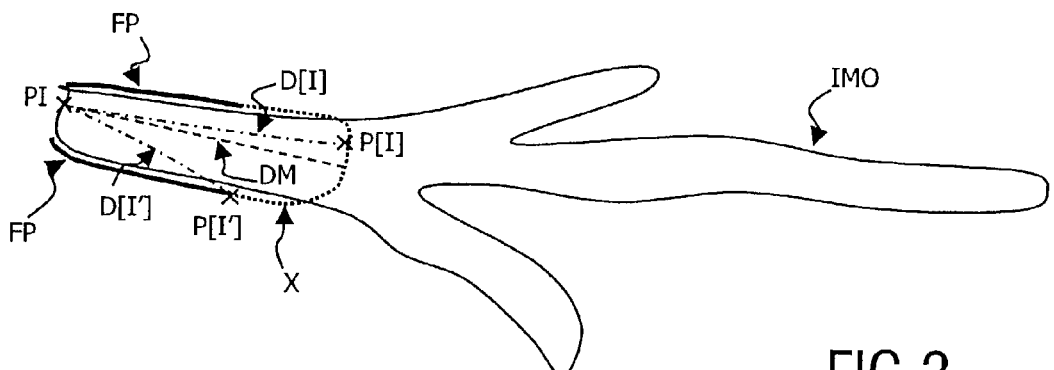
Figure 5:
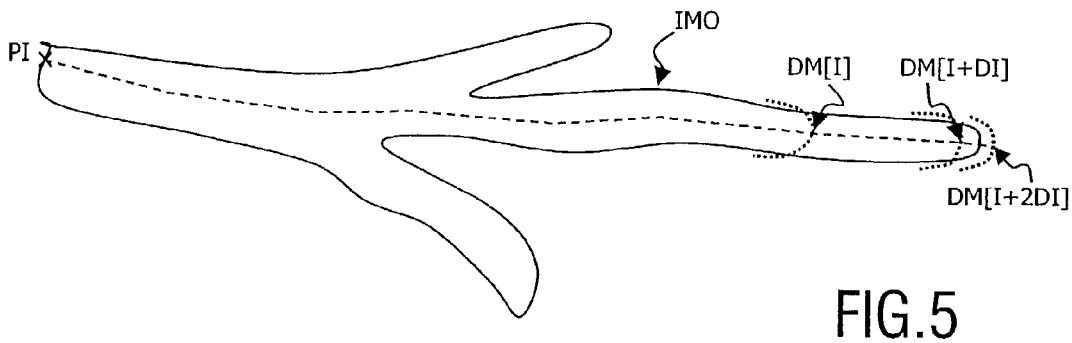
Figure 6:
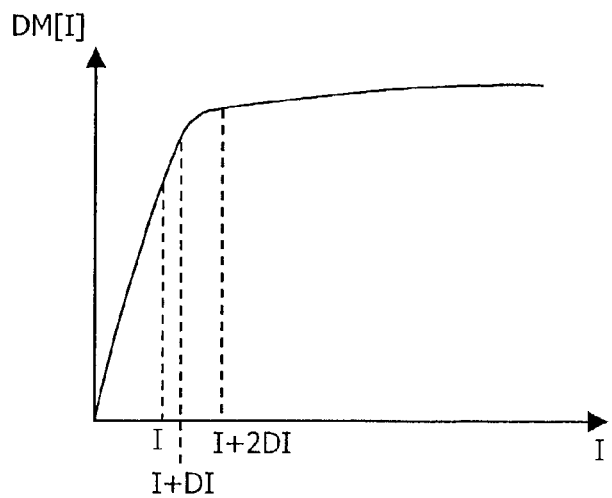

FIG. 1 depicts a schematic diagram of a medical imaging station according to the invention, FIG. 2 illustrates schematically the functioning of the means of automatic detection of emergence of the propagation edge from the imaged object at a current point, in a first embodiment of the invention, FIG. 3 illustrates schematically the functioning of the means of automatic detection of emergence of the propagation edge from the imaged object at a current point, in a second embodiment of the invention, FIG. 4 depicts a schematic diagram of a medical imaging station according to the second embodiment of the invention, FIGS. 5 and 6 illustrate schematically the functioning of the means of automatic detection of emergence of the propagation edge from the imaged object at a current point in a third embodiment of the invention.

Many acquisition methods can benefit from the invention in a medical imaging station according to the invention. Whenever an image having gray levels can be obtained using the method utilized by the acquisition means of the medical imaging station, the medical station according to the invention is used to advantage. Thus images obtained by ultrasonic, radiological or magnetic resonance techniques can be processed by a medical imaging station according to the invention. The invention will be particularly advantageous for the processing of images depicting slender objects: vessels etc.

FIG. 1 depicts a schematic diagram of a medical imaging station according to the invention. This station includes acquisition means ACQ for obtaining images having gray levels, display means DIS for displaying the images, advantageously the segmentation and possibly its change, in two or three dimensions. The medical imaging station includes segmentation means SEG for segmenting at least one imaged object in an image IM by propagation of an edge from at least one initial point positioned in the image IM on the imaged object by point positioning means POS. The segmentation means SEG include means PROP of propagating an edge within the image IM. This propagation is shown in FIG. 1 by the letter I, which represents a reference to each point in the image I, the letter I being incremented in order to sweep the whole of the image according to the edge propagation equations. Thus the propagation means PROP make the edge propagate on the points P[I] of the image IM by incrementing I and making correspond to the value I a following point P[I] chosen in a manner corresponding to the propagation equations. The cost calculation, useful to a shorter-path algorithm, is made gradually according to a discrete method defined for the Fast Marching using the propagation equations (Eikonal for example). According to the descriptions of the state of the art, the speed of the propagation depends on the gray level at each point known as the current point. The propagation equations and the details relating to this edge propagation are accessible to persons skilled in the art in the book by J. A. Sethian cited previously. Separation means SEP make it possible to separate each point P[I] through which the edge passes as belonging to the segmentation of the imaged object. The separation is defined by points P[I] passed through compared with the points not passed through. In the state of the art, the technique of segmentation by edge propagation is continuous and stops, for example, only when the order is given by a user who judges that the segmentation is correct. Two phenomena are then a problem. Firstly, the segmentation by propagation of an edge in an image functions correctly when the gray levels between the inside of an imaged object and the outside are very different, that is to say there exists a high contrast between the two zones. When, on the other hand, the contrast is less great the segmentation "leaks": points not belonging to the object have the edge passing through them. The segmentation obtained is then false with the drawbacks that this may present in particular in the medical field. This is particularly a drawback with slender objects for which, the propagation taking place in all directions indifferently and not having any stop criterion dedicated to preventing it, the edge propagates easily and rapidly outside the object in directions where the object has the smallest dimension. Moreover and in the extreme, if the propagation is not stopped by the user, the propagation of the edge takes place in accordance with the equations presented above until all the image is passed through. No segmentation of the image is then effected. This is because a segmentation using a shortest-path algorithm takes place in all directions and does not stop as long as the segmentation is not stopped.

One aim of the invention is to provide segmentation means within a medical imaging station which makes it possible to prevent the "leakages" of the propagation of the edge outside the imaged object to be segmented, in particular when the contrast is low and/or the object to be imaged is slender.

In a medical imaging station according to the invention, the edge propagation means PROP are coupled with means DET of automatic detection of an emergence of the propagation edge from the imaged object at a current point P[I], means FIX[I] of local fixing of the speed of propagation at zero at this current point P[I] being activated in the event of detection of an emergence of the propagation edge by the detection means DET. The detection means DET function according to one of the embodiments presented hereinafter. These embodiments each use a test on a characteristic of the current point P[I] with respect to an external characteristic CR fixed otherwise. These embodiments are independent and can be used alone or combined with each other so as to provide if necessary a detection according to several criteria.

When the detection is positive (case Y), the speed is fixed at zero by means FIX of fixing the propagation speed at zero and then the propagation is continued by the propagation means PROP for another point in the image for which the propagation speed is not fixed. This point is not necessarily in continuity (taken in the direction of propagation) with the point which was fixed. This is because the very structure of the propagation equations means that, with a zero speed at one point, the points which are situated in the vicinity of this point outside the segmented zone cannot form part of the points on which the edge propagates. When the detection is negative (case N), the propagation is continued by the propagation means PROP for another point of the image. Fixing the speed at zero therefore makes it possible in particular to stop the propagation locally while the propagation continues on other parts of the image. In the particular case of vessels, it is advantageous to "freeze points" by allocating a zero value to the speed at these points and therefore by making the speed at these points independent of the image.

FIG. 2 illustrates schematically the functioning of a first embodiment of the invention. In this embodiment, the propagation means are such that, in addition to a first edge X propagating in the image from a first initial point, at least one second edge X' propagates in the image from at least one second initial point positioned on the image on a second object. The number of edges propagating simultaneously in the image may be variable according for example to the number of different tissues imaged on the image (which in general represent various imaged objects). The means DET of automatic detection of emergence of the propagation edge from the imaged object at a current point PX[I] detect whether two adjacent points PX[I] and PX'[I] each belong to a different edge. The means FIX[I] of local fixing of the propagation speed are activated at two adjacent points PX[I] and PX'[I] when the two adjacent points PX[I] and PX'[I] each belong to a different edge, as depicted in FIG. 2. The simultaneous propagation of the edges in fact makes it possible to implement a concurrence between the edges. The detection of belonging to a different edge, belonging to an edge being a characteristic of the point, is, for example, effected according to the knowledge of a person skilled in the art by a test on the criterion CR of belonging to another edge X' on the point PX[I] on which an edge X propagates. Where an edge has already run through this point, the speed of the point is fixed at zero according to the invention for the propagations of the two edges X and X' concerned. In this embodiment, the segmentation is for example stopped when all the points of the image have been run through.

FIG. 3 illustrates schematically the functioning of the means DET of automatic detection of an emergence of the propagation edge X from the imaged object IMO at a current point, in a second embodiment of the invention. FIG. 4 depicts a schematic diagram of a medical imaging station according to the second embodiment of the invention. In FIG. 3 the two points P[I], P[I'] are two examples of a current point (referenced P[I] in FIG. 4) for which the functioning of the detection means DET is different. In this embodiment, the means DET of automatic detection of emergence of the edge X of propagation of the imaged object IMO at a current point, use means, referenced EST in FIG. 4, of estimating the distance D[I], respectively D[I'], from the point of the edge passed through P[I], respectively P[I'], to the initial point PI with respect to the distance to the maximum initial point DM reached by the edge. The distances are calculated according to a technique known to persons skilled in the art, for example, in the article included by reference by T. Deschamps and L. D. Cohen, "Minimal paths in 3D images and application to virtual endoscopy", Proc. 6th European on Computer Vision, ECCV 2000, Dublin, June/July 2000 In: Lecture Notes in Computer Science, Vol. 1843, 2000, 543–557. The means FIX[I] of fixing the speed of the propagation at zero are activated when the difference between the two distances DM and D[I] is greater than a distance threshold TH. In FIG. 3, it can thus be seen that the difference between D[I] and DM is small while that between D[I'] and DM is greater. The speed at point P[I'] is fixed if the difference between D[I'] and DM is greater than a distance threshold TH. The value of the threshold is advantageously chosen so as to be close to the diameter of the object to be imaged. This is what is proposed in FIG. 3. Thus the speed of the edge is already fixed at zero at the points FP. Thus, here the point P[I'] situated at the boundary of the points whose speed is fixed at zero, appears to be in case Y in FIG. 4: the speed of the edge at point P[I'] is fixed at zero by the fixing means FIX. On the other hand, the point P[I] is such that the distance threshold is not reached. The propagation therefore continues through the propagation means PROP, which then choose a point adjacent to P[I] which will in its turn be tested by the detection means DET. It can be seen in FIG. 3 that the segmentation obtained for the start of the imaged object on which the speed of the points is fixed does indeed follow the shapes of the object. In the case of the segmentation of a vessel, the propagation continues along the vessel but is stopped for points where the speed is low, that is to say those for which the gray level does not allow a rapid speed and which are, in this case, generally outside the vessel, that is to say outside the object to be segmented. FIG. 3 illustrates such a case well. In practice, the segmentation obtained with local speed fixing at zero is rapid and of good quality. The speed is ensured by the fact that the edge no longer propagates for points which follow the fixed points. The calculation resources are thus saved on and the segmentation operation is accelerated.

FIG. 4 presents means for determining what is the value of the distance to the maximum initial point DM reached by the edge. At each point P[I] where the edge propagates, comparison means COMP compare D[I] with the last value DM stored in memory MEM. If D[I] is less than DM, the value DM is transmitted to the detection means DET. If D[I] is greater than DM, the value of D[I] is stored in memory as the value of DM and this new value is then used by the detection means DET. DM is therefore a strictly increasing function.

FIGS. 5 and 6 concern a third embodiment of the invention. In this embodiment, FIG. 3 illustrates schematically the functioning of the means DET of automatic detection of an emergence of the propagation edge X from the imaged object IMO. The edge X is depicted in the figure at three propagation times corresponding to I, I+DI, I+2DI. The increment DI is chosen according to particular criteria explained hereinafter. In this embodiment, the maximum distance DM traveled by the edge is used as a characteristic of the current points by the means DET of detecting emergence from the imaged object by the edge. The maximum distance DM, as noted above, is an increasing function of the iteration I. The maximum distance DM changes first of all quickly as seen in FIG. 6. This rapid change corresponds to the propagation inside the object where the propagation is rapid, the maximum distances DM corresponding to the points situated inside. This is illustrated by the distances DM[I] and DM[I+DI]. On the other hand, when the edge emerges from the object, that is to say encounters a zone where generally the gray level is different, the edge propagates less quickly as illustrated in FIG. 6 by the maximum distance DM[I+2DI]. Thus, for the same iteration increment DI, the maximum distance has changed less than before when the edge was going quickly. This is illustrated in FIG. 6 by the inclination of the slope of the curve of the maximum distance according to the iteration on I. The detection of the inclination of the slope of the curve can be made by a test carried out on the difference between the maximum distance to the current point DM[I+2DI] and the maximum distance for a current point corresponding to a prior iteration of an increment of DI: DM[I+DI]. The comparison of this difference DM[I+2DI]−DM[I+DI] with the same difference calculated before DM[I+DI]−DM[I] makes it possible to detect the inclination of the slope. The monitoring of the slope is a monitoring of the increase of a maximum distance to the initial point reached by the edge. The means of fixing the speed of the propagation at zero are activated in each point of the edge when the increase of said maximum distance to the initial point is less than an increase threshold, said increase threshold being represented on FIG. 6 by a slope threshold. This detection for the iteration I+2DI fixes the propagation speed of the edge at zero. The fixing of the propagation speed is here carried out for all the points of the edge since the detection of the emergence of the edge from the imaged object is global rather than local.

The embodiments of the means of detecting emergence of the edge from the imaged object presented can be used alone or in combination with each other. Thus it may be noted that combining the second and third embodiments is particularly advantageous. This is because fixing the local propagation speed at zero at points which are external to the object increases the slope of the curve in FIG. 6 since fewer points are run through for the same maximum distance (the fixed points are no longer the subject of propagation). Thus the inclination of the slope is greater and detecting the change in slope is easier. In this way, the segmentation is not only stopped when, during the propagation itself, the edge emerges from the imaged object locally while part of the edge remains in the object, but in addition the global propagation of the edge is stopped when the edge truly completely emerges from the imaged object. The third embodiment is then a way of completely stopping the segmentation of the object, therefore implying no intervention by the user. The invention is therefore particularly useful for the automatic segmentation of the object: this segmentation takes place without intervention of the user without "leaking" and automatically stopping when the object has been segmented in its entirety.

The invention also concerns a segmentation device intended to be used in a medical imaging station. Such a segmentation device SEG is presented in FIG. 1. It includes the means necessary for implementing the segmentation according to one of the embodiments presented above. Thus one embodiment of the segmentation device SEG according to the invention is disclosed in FIG. 4, described by the terms segmentation means. The invention also concerns a segmentation method as implemented by the use of the means of the medical imaging station according to the following claims.

There are many ways of implementing the functions presented in the means and the steps of the method according to the invention by software and/or hardware means accessible to persons skilled in the art. This is why the figures are schematic. Thus, although the figures show various functions performed by various blocks, this does not exclude a single software and/or hardware means for performing several functions. Nor does this exclude a combination of software and/or hardware means for performing a function. A method according to the invention is not only as described in Claim 7 but can also include steps specific to the embodiments described in Claims 2 to 5, steps performed by the means described in these claims.

Although this invention has been described in accordance with the embodiments presented, a person skilled in the art will immediately recognize that there exist variants to the embodiments presented, for example the means of automatic detection of emergence of the propagation edge from the imaged object at a current point may use means of estimating the local speed of the edge at this point (for example by using distance measurements), the means of fixing the speed of the propagation at zero being activated for a local speed lower than a threshold speed, and that these variants remain within the spirit and scope of the present invention.

The invention claimed is:

1. A medical imaging station including acquisition means for obtaining images having gray levels, display means for displaying the images, segmentation means for segmenting at least one imaged object in an image, using means of propagating an edge on the points of the image from at least one initial point positioned in the image on the imaged object by point positioning means, a propagation whose speed depends on said gray levels at each point referred to as the current point, the segmentation being effected between the points through which the edge passes and the points through which the edge does not pass, characterized in that the edge propagation means are coupled with means for the automatic detection of emergence of the propagation edge from the imaged object at a current point, means for local fixing of the speed of propagation at zero at this current point being activated in the event of detection of emergence of the propagation edge.

2. A medical imaging station as claimed in claim 1, characterized in that the propagation means make at least a second edge propagate in the image from at least a second initial point positioned on the image on a second object, the means of automatic detection of emergence of the propagation edge of the imaged object at a current point detecting where the two adjacent points each belong to a different edge, the means of local fixing of the speed of propagation being activated at two adjacent points when the two adjacent points each belong to a different edge.

3. A medical imaging station as claimed in claim 1, characterized in that the means of automatic detection of emergence of the propagation edge from the imaged object at a current point use means of estimating the local speed of the edge at this point, the means of fixing the speed of the propagation at zero being activated for a local speed lower than a speed threshold.

4. A medical imaging station as claimed in claim 1, characterized in that the means of automatic detection of emergence of the propagation edge from the imaged object at a current point use means of estimating the distance of the point on the edge to the initial point with respect to the maximum distance to the initial point reached by the edge, the means of fixing the speed of propagation to zero being activated when the difference between these two distances is greater than a distance threshold.

5. A medical imaging station as claimed in claim 1, characterized in that the means of automatic detection of emergence of the propagation edge from the imaged object at a current point use means of monitoring the increase in a maximum distance to the initial point reached by the edge, the means of fixing the speed of propagation of the edge at zero being activated at all the points on the edge when the increase in the maximum distance is lower than an increase threshold.

6. A segmentation device for segmenting at least one imaged object in an image having gray levels, using means of propagating an edge on the points of the image from at least one initial point positioned in the image on the imaged object by point positioning means, a propagation whose speed depends on the said gray levels at each point referred to as a current point, the segmentation being effected between the points passed over by the edge and the points not passed over by the edge, characterized in that the edge propagation means are coupled with means of automatically detecting an emergence of the propagation edge from the imaged object at a current point, means of locally fixing the speed of propagation at zero at this current point being activated in the event of detection of an emergence of the propagation edge.

7. A method of segmenting an imaged object in an image having gray levels including a step of propagating an edge on the points of the image from at least one initial point positioned in the image on the imaged object in a step of positioning point in the image, a propagation whose speed depends on the said gray levels at each point referred to as a current point, the segmentation being effected between the points passed over by the edge and the points not passed over by the edge, characterized in that the edge propagation step is coupled with a step of automatic detection of an emergence of the propagation edge from the imaged object at a current point, a step of fixing the speed of propagation at zero at the current point being activated in the event of detection of emergence of the propagation edge.

8. A computer program product comprising program code portions/means/instructions for executing steps of the method according to claim 7 when said program is executed on a computer.

* * * * *